S. MARSH.
Sand-Band.
No. 223,935.  Patented Jan. 27, 1880.
Fig. 1.
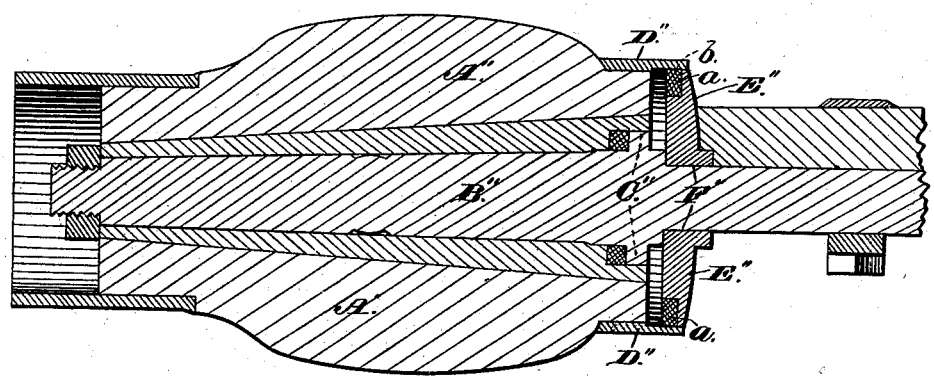
Fig. 2.  Fig. 3.
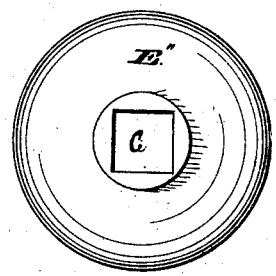 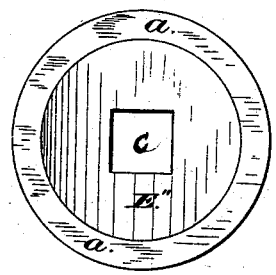
WITNESSES:
Edmund S. Phillips.
Sherwood Phillips.
INVENTOR:
Samuel Marsh

UNITED STATES PATENT OFFICE.

SAMUEL MARSH, OF GLENHAM, NEW YORK.

SAND-BAND.

SPECIFICATION forming part of Letters Patent No. 223,935, dated January 27, 1880.

Application filed December 18, 1879.

*To all whom it may concern:*

Be it known that I, SAMUEL MARSH, of Glenham, in the county of Dutchess and State of New York, have invented a new and useful Improvement in Guard-Plates for Hubs of Vehicle-Wheels; and I do hereby declare that the following is a full, clear, and exact description thereof, which will enable others skilled in the art to make and use the same, reference being had to the accompanying drawings, forming part of this specification, in which—

Figure 1 represents the sectional view of the hub and axle with the guard-plate attached to the axle and hub. Fig. 2 represents the outside face back of the guard-plate detached from the axle and hub. Fig. 3 represents the inside of the guard-plate, showing the washer attached to the said plate on the outer edge in the rabbet.

A'' is the hub of the wheel; B'', the arm of the axle in the hub; C'', the flange of the axle-arm; D'', the metal band around the hub; E'', the guard-plate; F'', the axle at guard-plate.

The sectional view, Fig. 1, shows the hub A'', axle-arm B'', arm-flange C'', and the guard-plate E'', and the manner of the guard-plate attachment to the axle F'' and back of the hub; also, the sectional view of the guard-plate E'' with its convex surface-line, outer face, and the flange around the same at the axle F'', and its circular form, as shown in Fig. 2, with its inside plain surface and rabbeted edge for the washer *a*, as shown also in Fig. 3.

*b* is a recess or sink, formed by the thickness of the shoulder of the arm-flange C'', and between the hub A'' and the guard-plate E''.

*c* in Figs. 2 and 3 represents the square holes for the insertion of the axle F''.

The edge of the metal hub-band D'' projects out from the back of the hub A'', forming the depth of the sink *b* around the axle F'', for the insertion of the guard-plate E'' up to the shoulder of the arm-flange C'', the circular edge of the guard-plate fitting within the metal band.

The washer *a* in the edge of the guard-plate E'' closely fits the hub-band D'', preventing the dust, sand, or any gritty substance collecting within the hub A'', and protecting the arm of the axle B'' while in the hub.

The circular recess or sink *b* in the back of the hub A'' gives space for the allowance of the longitudinal motion and wear of the arm of the axle at the arm-flange C''.

I am aware that a circular guard-plate secured upon the axle and fitting within the hub-band has heretofore been used, and I lay no claim thereto; but my improvement consists in forming a rabbet in the edge of the circular plate and filling the same with a packing-washer, which secures a closely-fitting joint between the plate and hub-band, and thereby more effectually excludes dust, &c. It also retains the lubricant within the hub and prevents it soiling the outside of the hub and axle.

What I claim is—

The combination of the circular guard-plate E'', having the rabbeted edge, and packing-washer *a* with the hub-band D'' and axle F'', substantially as described.

SAMUEL MARSH.

Witnesses:
 EDMUND S. PHILLIPS,
 SHERWOOD PHILLIPS.